United States Patent [19]

Dillon

[11] Patent Number: 4,715,702

[45] Date of Patent: Dec. 29, 1987

[54] DECORATIVE LENS

[76] Inventor: Stephen M. Dillon, 7442 E. Butherus Dr., Scottsdale, Ariz. 85260

[21] Appl. No.: 920,762

[22] Filed: Oct. 20, 1986

[51] Int. Cl.$^4$ .............................. G02C 7/10; G02B 5/30
[52] U.S. Cl. ........................................ 351/44; 351/51; 351/165; 350/396
[58] Field of Search ...................... 351/44, 45, 51, 165, 351/166; 350/396, 407

[56] References Cited

U.S. PATENT DOCUMENTS

| | | | |
|---|---|---|---|
| D. 206,624 | 1/1967 | Hoffman | D57/1 |
| D. 235,479 | 6/1975 | Filho | D16/06 |
| 2,230,009 | 1/1941 | Ordorica | 88/41 |
| 2,281,101 | 4/1942 | Land | 350/396 |
| 2,543,179 | 2/1951 | Land et al. | 350/396 |
| 3,731,993 | 5/1973 | Piringer | 351/165 |
| 4,145,125 | 3/1979 | Chika | 351/165 |

OTHER PUBLICATIONS

Vogue page 108, 3/15/67.

*Primary Examiner*—John K. Corbin
*Assistant Examiner*—P. M. Dzierzynski
*Attorney, Agent, or Firm*—Warren F. B. Lindsley

[57] ABSTRACT

An improved structure for providing a decorative pattern over the surface of sunglasses, the structure combining a positive decorative pattern on a first layer, a reflective layer, and a third layer incorporating a negative decorative pattern. The decorative pattern is readily apparent to an observer, but the negative pattern cancels the image for the wearer who then sees only a uniform color or hue that does not interfere with his vision or cause an unpleasant distraction.

9 Claims, 13 Drawing Figures

DECORATIVE LENS

BACKGROUND OF THE INVENTION

Recent developments in the field of optometrics have made possible numerous innovations involving lenses. Included in such innovations are glare-proof glass for pictures, one-way glass, window panes and eyeglass lenses that are transparent from one side and reflective from the other. Reflective or tinted glass is employed in windows to reduce glare on the inside and also to reduce cooling costs by blocking radiated heat from the sun during hot weather. One-way glass opens up the interior of a structure to an attractive view outside while preserving a degree of privacy on the inside. Various reflective lens applications for sunglasses are currently popular with young people, particularly women using highly ornamental frames.

DESCRIPTION OF THE PRIOR ART

Examples of such innovations as applied to eyeglasses are described in a number of U.S. patents, including the following:

U.S. Pat. No. 2,230,009 describes an anti-glare spectacle comprising in combination a pair of lens members and a screen member adhesively interposed between said lens members, the screen member comprising a flexible sheet having formed thereon transparent circular portions separated by translucent portions.

U.S. Pat. No. 3,731,993 describes a spectacle lens to be worn by a person with deficient color vision. The lens supports a thin surface layer constituted by a plurality of juxtaposed small color filter regions of different colors and respective spectral transmission factors which differ in magnitude in inverse proportion to the diagnosed sensitivity of the intended user.

U.S. Pat. No. 4,145,125 describes eyeglass lenses, ordinarily of plastic or hard resin, which are tined by a deep penetrating dye, the dye becoming a part of the molecular structure of the lens. Masking during the dying process produces designs or indicia in a shaded area that may cover only a portion of the lens.

U.S. Pat. No. 206,624 discloses a glare shield to be worn over spectacles. The glare shield carries on its outer surface a decorative geometric pattern in the form of modified rectangles of various dimensions and proportions.

U.S. Pat. No. 235,479 shows a novelty lens for a pair of sunglasses, the lens being decorated by a heart shaped pattern.

Vogue Magazine, on page 108 of its Mar. 15, 1967 issue, discloses a pair of designer sunglasses having a series of rectangularly arranged circles decorating the lens.

The prior art is thus seen to disclose a wide application of new technology to eyeglasses and particularly sunglasses and demonstrates an interest in decorative sunglasses. In one important regard, however, the prior art has failed to recognize a feature of importance to the wearer of the decorative glasses, namely rendering the decorative design invisible to the wearer so that his or her vision will not be obstructed. If this feature is not incorporated in the glasses, the resulting impaired vision can constitute a safety hazard and a source of eyestrain and fatigue.

SUMMARY OF THE INVENTION

In accordance with the invention claimed, an improved construction for a decorative lens is provided which provides a means for producing on the lens a design that is highly visible by a viewer from one side of the lens while totally obscured or invisible to a viewer on the other side.

It is, therefore, an object of the present invention to provide an improved lens structure.

Another object of this invention is to provide a means for applying a decorative design to the lens of sunglasses that is highly visible by a viewer, but invisible to the wearer so that the wearer's vision is not obstructed thereby.

A further object of this invention is to provide in such a novel sunglass structure means for incorporating one or more colors in a decorative design.

A still further object of this invention is to provide in such a construction means for inexpensively providing custom decorations that are specifically directed to meet the needs or interests of an individual wearer.

A still further object of this invention is to provide a construction that is applicable in its broadest form to windows, eyeglasses, showrooms and the like.

Further objects and advantages of the invention will become apparent as the following description proceeds and the features of novelty which characterize the invention will be pointed out with particularity in the claims annexed to and forming a part of this specification.

BRIEF DESCRIPTION OF THE DRAWINGS

The present invention may be more readily described with reference to the accompanying drawings in which.

DESCRIPTION OF THE PREFERRED EMBODIMENT

Figure 1:
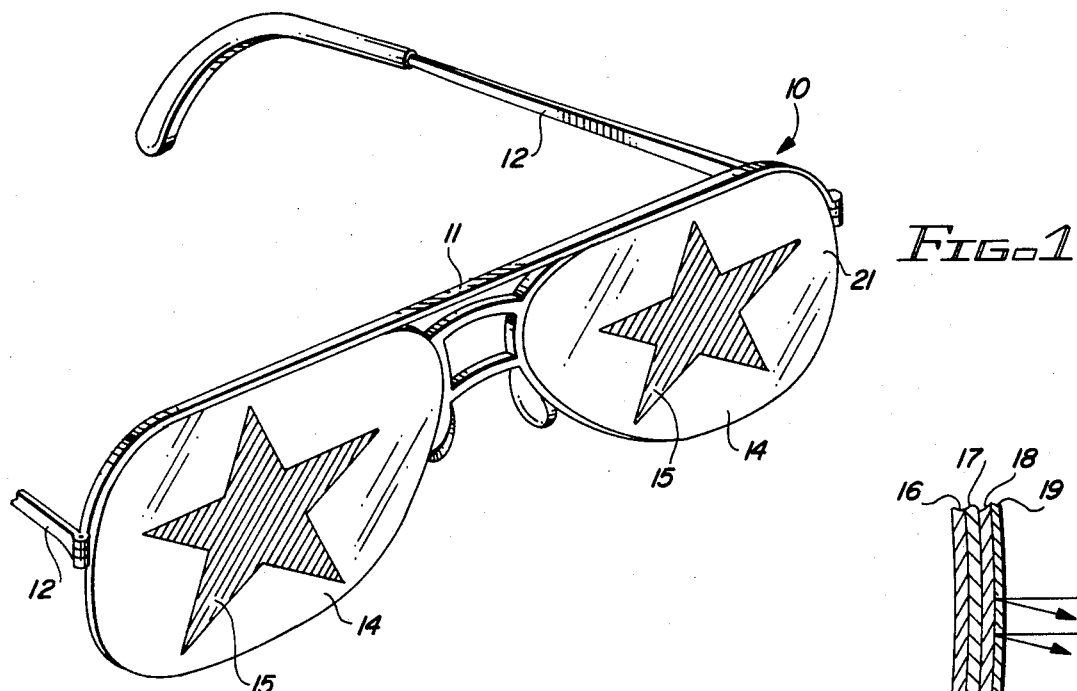
FIG. 1 is a perspective view of a pair of sunglasses bearing a decorative design embodying the invention.
Figure 2:
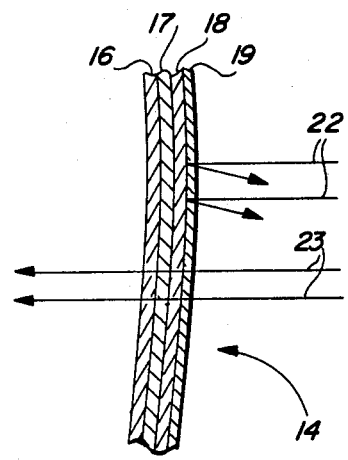
FIG. 2 is a cross-sectional view of a lens of the eyeglasses shown in FIG. 1.
Figure 3A:
FIGS. 3A–3D comprise views of the various elements of the laminated lens structure of the sunglasses of FIGS. 1 and 2 showing plan views of the individual elements of the lens in the order in which they are assembled.
Figure 3B:
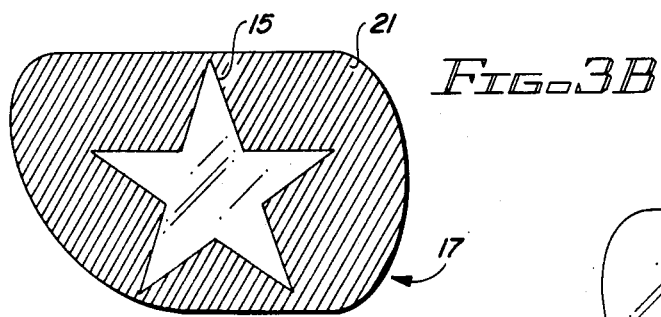
Figure 3C:
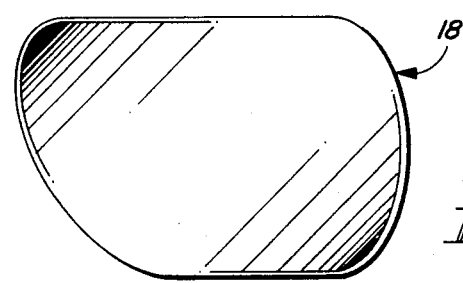
Figure 3D:
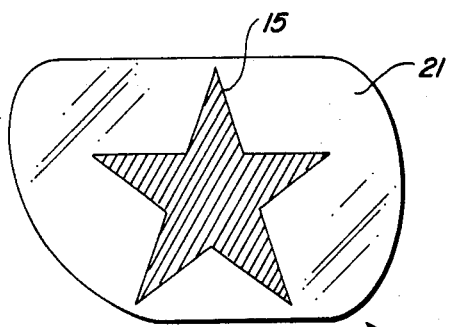

Referring more particularly to the drawings by characters of reference, FIGS. 1–3 disclose a pair of decorative sunglasses 10 embodying the invention and comprising a frame 11, temples 12 and lenses 14. Each lens bears a decorative pattern shown in the form of a star 15. In accordance with the principles of the invention, the decorative pattern is readily apparent to a viewer not wearing the sunglasses, but is invisible to the wearer and produces little or no distraction or impairment of vision for the wearer.

As indicated in FIGS. 2 and 3A–3D, each of the elements 14 comprises a laminated structure that includes four elements or layers 16–19.

Element 16 is a support structure in the form of a glass or plastic lens which may be of the corrective type as prescribed for an individual having impaired vision. Element 16 further may be colored to counteract the color combination arrived at by the use of lens 17 and 19.

Element 17 is a transparent sheet of plastic in which area 21 surrounding the pattern of star 15 has the same color or hue and the same intensity as the area inside star 15 as it appears in FIG. 1.

Element 18 is a transparent plastic sheet that has been coated with a material that renders it reflective to light, and particularly to light striking the surface of element 18 that is directed away from the wearer of sunglasses 10. The reflective material may be applied in the form of a very thin layer of metal, so thin and sparsely applied that only a fraction of the impinging light is reflected and the remainder passes through. Such reflective layers are typically applied by vapor deposition of the metal.

Element 19 is the same as element 17 except for the coloring of the decorative pattern. While the pattern carried by element 17 is the negative or opposite of the pattern shown in FIG. 1, the pattern carried by element 19 is the same as that shown in FIG. 1. As indicated in FIG. 2, the elements 16–19 are assembled in numerical order and laminated together to form lens 14. When lens 14 is assembled with frame 11 and temples 12, element 16 is immediately adjacent the eye of the wearer of the sunglasses 10 and element 19 is on the outside of the lens assembly spaced from the eye of the wearer.

In use, lens 14 functions as follows. Light rays 22 and 23 from the sun or other outside light source strike the outer surface of lens 14, as shown in FIG. 2. Some of the rays, as for example, rays 22, pass through element 19 and are reflected by element 18 back through element 19 rendering the decorative pattern carried by element 19 visible to a viewer of the person wearing the sunglasses 10. The image seen by the wearer, on the other hand, is produced by those rays 23 which pass through elements 19, 18, 17 and 16 into the wearer's eye. Those rays 23 that pass through the colored or shaded star 15 of element 19 pass through the uncolored or unshaded area 15 of element 17 while those that pass through the uncolored or unshaded area 21 of element 19 pass through the colored or shaded area 21 of element 17.

Each of the rays 23 that reaches the eye of the wearer must, therefore, pass through a colored or shaded area and through an uncolored or unshaded area so that all of the rays 23 reaching the eye of the wearer are altered in the same way. As a result, the wearer does not see the decorative pattern and the lens appears to the wearer to be uniformly tinted or shaded in the color carried by the star 15 in FIG. 1.

If the area 21 surrounding star 15 of element 19 is clear and uncolored, an observer or viewer will see star 15 with a surrounding reflective portion 21.

Figure 4:
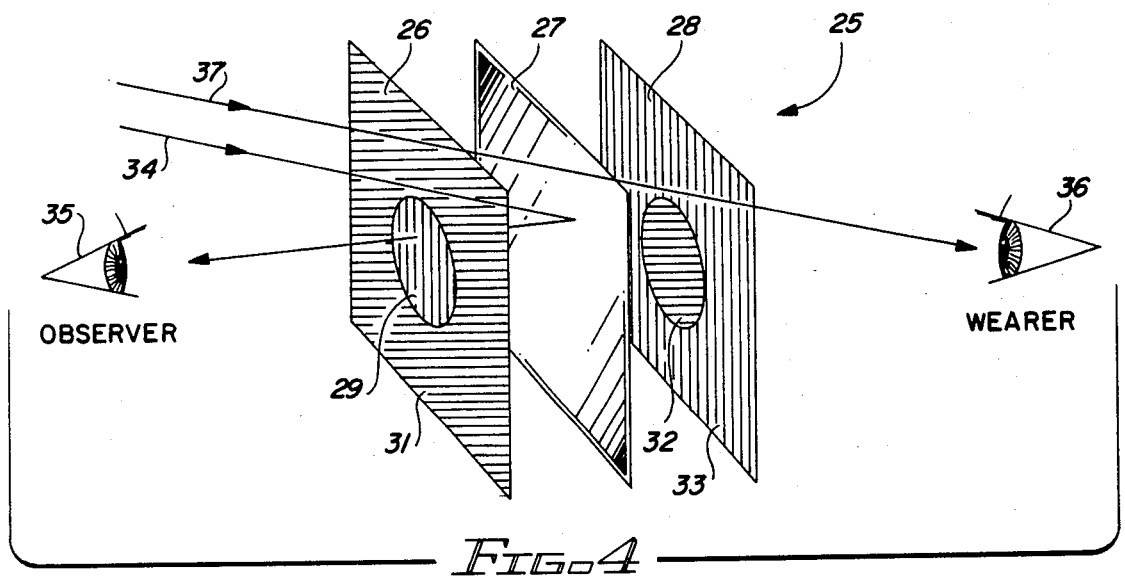
FIG. 4 is a functional diagram illustrating both the structure and the functionality of the laminated lens structure of the invention in an embodiment utilizing more than one color in the decorative design.

A variation of the invention is suggested in FIG. 4 wherein a multicolored overall pattern is presented to the observer rather than a monocolored design on a reflective field. The laminated lens structure 25 represented in FIG. 4 comprises a first multicolored transparent element 26, a reflective element 27 and a second multicolored transparent element 28.

The decorative multicolored pattern of element 26 is represented by a simple two-colored pattern comprising a red circle 29 in the center of a blue field 31.

Element 28 has a centered blue circle 32 in a red field 33. Blue circle 32 is the same size as red circle 29, and the two circles are aligned exactly when the three elements 26–28 are laminated together.

In the completed structure 25, light rays 34 that pass through element 26 and are reflected by element 27 back through element 26, produce a red and blue pattern as seen by the eye 35 of an observer. The eye 36 of the wearer, however, receives a uniform field of transmitted rays 37, all of which must pass through a red field and a blue field before reaching the eye 36. The viewer thus sees a uniform field with a purple hue. It will be recognized that additional color areas may be added to element 26 in colors other than red or blue, but each time an additional colored area is added to element 26, the same color must be added to the complimentary area of element 28. Complimentary colors may be added to one or more elements of a lens to provide a complete cancellation of any discerning color tint throughout the lens as observed by the wearer. Wherever there is a decorative color on element 26, there will be the absence of that exact reverse color on element 28. Vice versa, wherever there is a reverse color on element 28, there will be the absence of that exact color on element 26.

Figure 5:
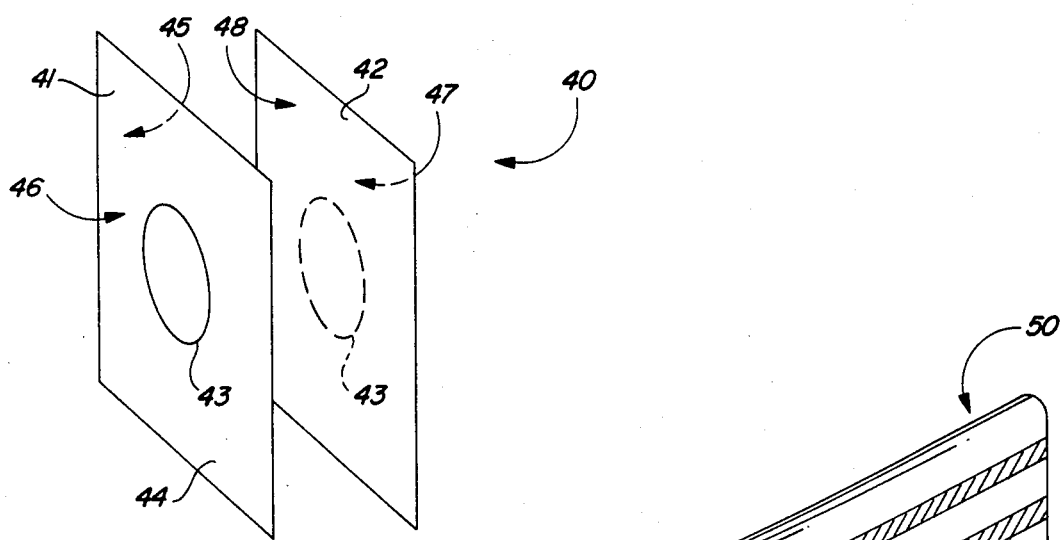
FIG. 5 is a functional diagram illustrating a refinement in the structure of the decorative lens.

A cost effective method for producing the decorative sunglass structure of the invention will now be described in connection with yet another variation of the invention, as shown in FIG. 5.

The decorative lens structure 40 of FIG. 5 comprises two transparent films 41 and 42. The two films are of a special type available from a number of suppliers, including the American Hoechst Corporation, Enco Printing Products of Somerville, New Jersey.

The first film 41 is a "Negative Acting Overlay Color Proofing Film" or NAPS. The NAPS film is available from the supplier in various colors, the color having been applied to the surface of the film by the supplier. In this form, the coating is not yet permanent, i.e. it may be easily removed by developing out with suitable chemicals. The coating becomes fixed to the film, however, when exposed to a suitable light source.

The second film 42 is a "Positive Acting Overlay Color Proofing Film" or PAPS, also available with a special color coating applied. In the case of the PAPS film, however, the coating is initially fixed to the film but becomes removable by developing when exposed to suitable light.

It should be noted that a positive and negative acting chemical coating of other suitable types may be used in place of the PAPS and NAPS films disclosed and still fall within the scope of this invention.

In a first implementation of the structure 40 of FIG. 5, a design comprising a red circle 43 in a clear or reflective field may be obtained as follows. A reflective coating is first applied to the surface 45 of film 41 on the side opposite the face 46 on which a red NAPS coating has been applied. As discussed earlier, the reflective surface may comprise a very thin deposit of a reflective metal. Film 42 which has a red PAPS coating on one surface 47 is then positioned with its uncoated surface 48 against the face of film 41 upon which the reflective coating has been applied and the two films 41 and 42 are bonded together. The bonded structure is then exposed to light through a mask that carries an image of the desired decorative pattern. When light is passed through the mask, the circular areas 43 of both films 41 and 42 are exposed to light while the areas outside the circle are not exposed. The red color is now fixed to the area inside circle 43 of NAPS film 41, while the red color outside circle 43 is fixed to the PAPS film 42. Finally, the coloring material is washed from the unfixed areas of films 41 and 42 leaving a red circle 43 on the forward face 44 of film 41 and a red field surrounding an uncolored circle 43 on the rearward surface or face 47 of film 42. The completed structure may then be bonded to a glass or plastic supportive lens or to a plastic sunshield after assembling the rear surface 47 of film 42 to a surface of the supporting lens or sunshield.

If a multicolored decorative pattern is desired in the structure 40 of FIG. 5, it is possible to add additional color patterns in subsequent processing operations. To add a blue pattern, for example, a blue NAPS color is applied to surface 44 of film 41 and a blue PAPS color is applied to surface 47 of film 42.

The structure 40 is then exposed to light through another mask defining the desired blue pattern. When the unfixed coloring materials are again washed away, the desired blue pattern remains along with the originally applied red pattern.

The processes just described result in perfectly aligned positive and negative patterns on films 41 and 42, and the alignment is achieved without resort to tedious and expensive alignment procedures.

Figure 6:
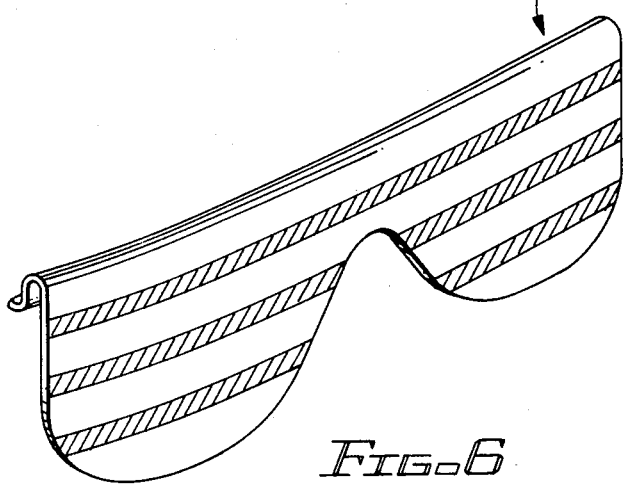
FIG. 6 is a perspective view of a decorative sunshield intended to be clipped over a pair of corrective spectacles.

FIG. 6 illustrates a decorative sunshield 50 incorporating the methods and structures of the invention. Variations of this design may be inexpensively produced for mass marketing, and they may be readily mounted over untinted prescription glasses or over conventional sunglasses.

FIGS. 7-10 disclose a means of using complimentary colors to provide a color tinting or color variation of the view observed by the wearer of the lens.

Figure 7:
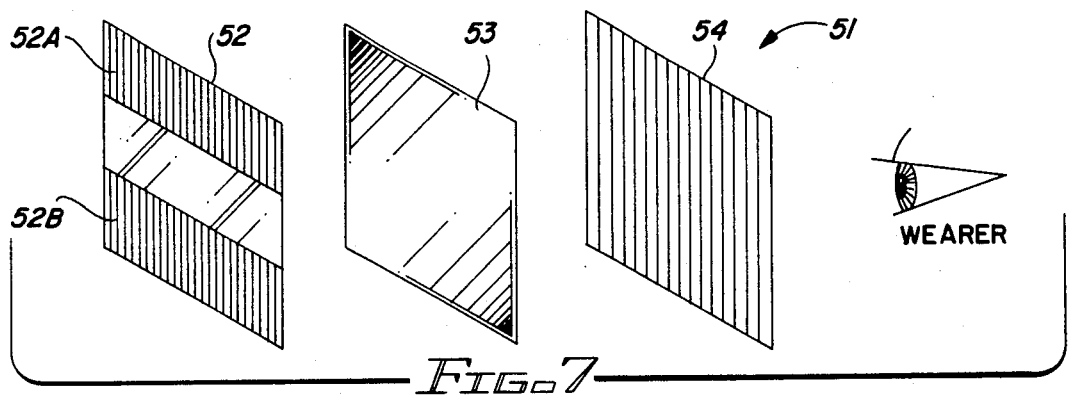
FIG. 7 is a functional diagram of another modification of the invention illustrating a monocolor arrangement with a tinted element employed for providing the wearer with a colored lens sensation for counteracting or enhancing the pattern color on the viewer's side of the lens.

FIG. 7 more particularly discloses a mono or single color arrangement of a lens 51 comprising elements 52, 53 and 54, not incorporating reverse colors. Element 52, for example, comprises two parallel strips 52A and 52B of red color separated in the middle by a parallel uncolored strip 52C. Element 53 is a reflective element similar to elements 18 and 27 of FIGS. 3 and 4. Element 54 is a tinted element either of a solid tint or ascending or descending in a gradient of any preferred color which is intended to counteract or enhance the pattern color on element 52. It should be noted that the color or tinted features of element 54 may be applied to the wearer's side of element 53, thereby eliminating element 54.

Figure 8:
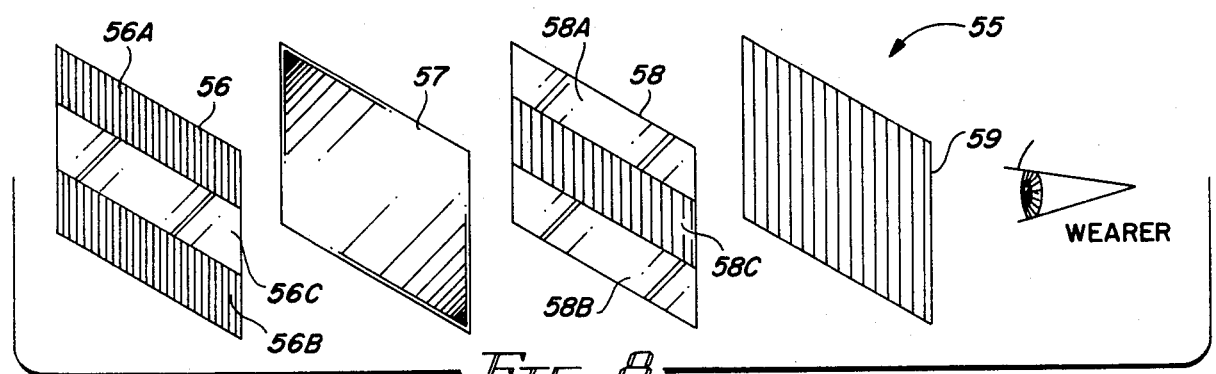
FIG. 8 is a functional diagram of a further modification of the invention illustrating a monocolor arrangement with an element added having the reverse pattern of same color but of different intensity shown on the wearer's side of the reflective element.

FIG. 8 is a further modification of an element assembly 55 wherein element 56 comprises, for example, parallel red areas 56A and 56B separated by an uncolored parallel area 56C. Element 57 comprises an element similar to element 53 of FIG. 7, as well as elements 18 and 27 of FIGS. 3 and 4. Element 58 comprises an element which is the reverse in pattern to element 56, but comprises the same color but of a different intensity. Element 59 may be used if it is desired to alter pattern colors to provide a tinted element of a gradient or solid tint configuration to the eye of a wearer of the lens.

Figure 9:
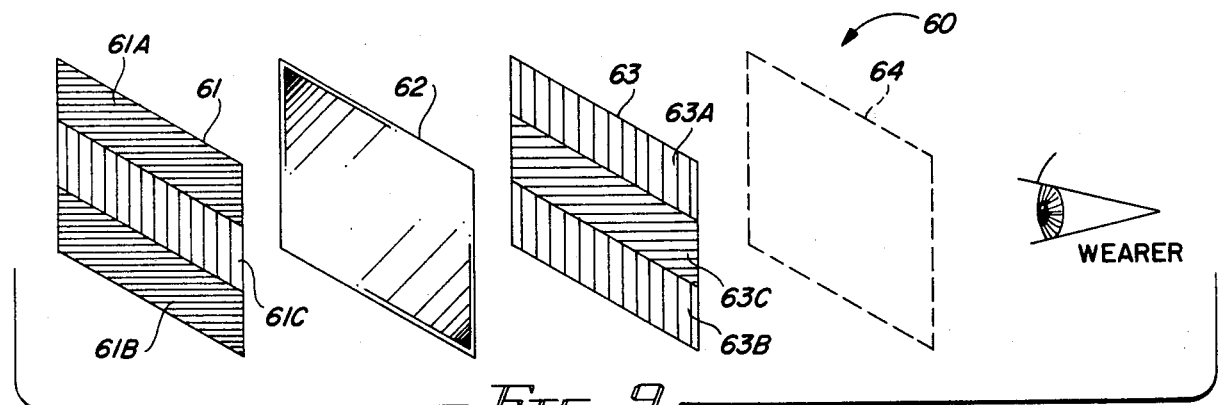
FIG. 9 is a functional diagram of a still further modification of the invention shown in FIGS. 7 and 8 wherein the element on the viewer side of the lens is multicolored and employing a reverse colored element of alternate color intensities for the purpose of forming color gradients.

FIG. 9 discloses an element construction 60 employing elements 61, 62, 63 and 64 wherein element 61 comprises a multicolored element having dark blue parallel strips 61A and 61B, separated by a light red strip or area 61C. Element 62 comprises an element similar to elements 18, 27, 53 and 57 of FIGS. 3, 4, 7 and 8. Element 63 comprises a reverse of the colors of element 61 wherein the pattern comprises light red strips 63A and 63B, separated by a light blue strip 63C. The purpose of this element construction is that the end product is all one color, but of alternating degrees of intensity from the wearer's side. Element 64 may be tinted to modify or enhance the appearance of the element construction to the eye of the user as heretofore explained.

Figure 10:
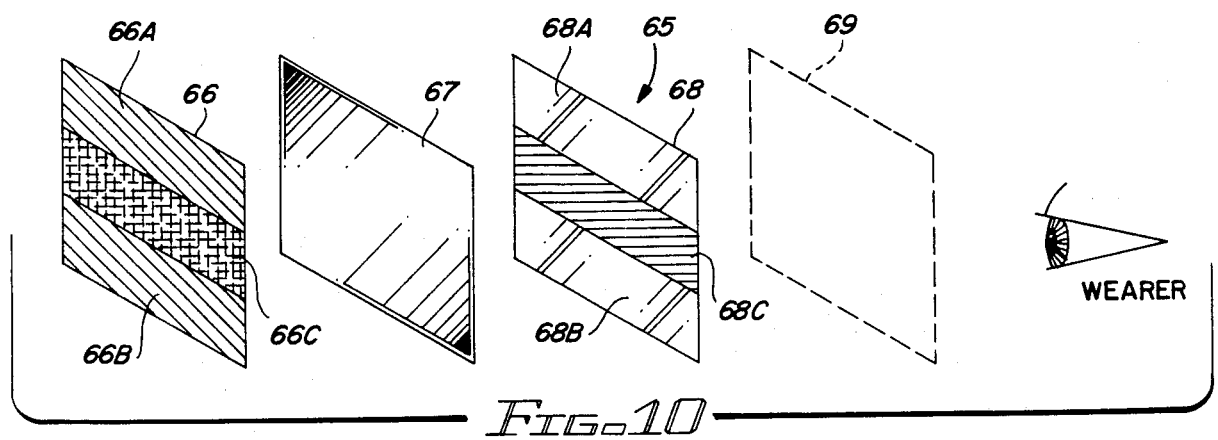
FIG. 10 is a functional diagram of a still further modification of the invention including an element for reverse mixing of colors other than those colors shown on the element of the lens viewed by the observer.

FIG. 10 discloses a further element construction 65 illustrating a reverse color mixing of colors other than those shown on the surface of element 66 to a viewer. Element 66 comprises an element having parallel strip areas 66A and 66B of a green color and the strip or area 66C therebetween of a yellow color. Element 67 is a reflective element similar to elements 18, 27, 53 and 57 of FIGS. 3, 4, 7, 8 and 9. Element 68 comprises an element having the same pattern as element 66, namely areas 68A, 68B and 68C, except a blue color is applied to area 68C. The blue strip is intended to mix with the yellow of area 66C of element 66, in order to blend with the surrounding field 66A and 66B of element 66, which is already of a green color to the wearer and the viewer. An optional tinted element 69 may be used if so desired.

An improved structure for sunglasses or for use in other applications, such as show windows, is thus provided in accordance with the stated objects of the invention, and although but a few embodiments of the invention have been illustrated and described, it will be apparent to those skilled in the art that various changes and modifications may be made therein without departing from the spirit of the invention or from the scope of the appended claims.

What is claimed is:

1. A multiple element construction comprising:
   a first transparent element having a first pattern formed thereon,
   said first pattern having a first color and a field surrounding said first pattern having a second color,
   a second transparent element coated with a relatively thin layer of reflective material,
   said thin layer of reflective material being so thin and sparsely applied so that only a fraction of light impinging thereon is reflected and the remainder passes therethrough, and
   a third transparent element having a second pattern identical to said first pattern formed thereon in axial alignment with said first pattern, said second pattern having a color identical with said second color of said first element and the field surrounding said second pattern having a color identical with said first color of said first pattern.

2. A multiple element construction comprising:
a first transparent element having a first pattern formed thereon,
said first pattern having a first color and a field surrounding said first pattern having a second color,
a second transparent element coated with a relatively thin layer of reflective material,
said thin layer of reflective material being so thin and sparsely applied so that only a fraction of light impinging thereon is reflected and the remainder passes therethrough, and
a third transparent element comprising a second pattern identical to said first pattern formed on the other side of said second element in axial alignment with said first pattern,
said second pattern having a color identical with said second color of said first element and the field surrounding said second pattern having a color identical with said first color of said first pattern.

3. The multiple element construction set forth in claim 2 wherein:
said second pattern and said field surrounding said second pattern being of the same color but of different shades than the colors of said first pattern and the field surrounding said first pattern.

4. A multiple element construction comprising:
a first transparent element having a first pattern formed thereon,
said first pattern having a first color and a field surrounding said first pattern having a second color,
a second transparent element coated with a relatively thin layer of reflective material,
said thin layer of reflective material being so thin and sparsely applied so that only a fraction of light impinging thereon is reflected and the remainder passes therethrough, and
a third transparent element having a second pattern identical to said first pattern formed thereon in axial alignment with said first pattern,
said second pattern having a like color of a different intensity of said second color and said field surrounding said second pattern having a like color of the same intensity of said first color,
whereby when the multiple element construction is viewed from the side reflecting light from said second element, the first and second patterns provide an image of given colors and when the multiple element construction is viewed from its other side, the multiple element construction appears as having the same basic color throughout, but of alternate intensity.

5. A multiple element construction comprising:
a first transparent element having a first pattern formed thereon,
said first pattern having a first color and a field surrounding said first pattern having a second color,
a second transparent element coated on one side with a relatively thin layer of reflective material,
said thin layer of reflective material being so thin and sparsely applied so that only a fraction of light impinging thereon is reflective and the remainder passes therethrough, and a third transparent element having a second pattern identical to said first pattern formed thereon in axial alignment with said first pattern,
said second pattern having a like color of the same intensity of said second color and said field surrounding said second pattern having a like color of a different intensity of said first color,
whereby when the multiple element construction is viewed from the side reflecting light from said second element, the first and second patterns provide an image of given colors and when the multiple element construction is viewed from its other side, the multiple element construction appears as having the same basic color throughout, but of alternate intensity.

6. A multiple element construction comprising:
a first transparent element having a first pattern formed thereon,
said first pattern having a first color and a field surrounding said first pattern having a second color,
a second transparent element coated with a relatively thin layer of reflective material,
said thin layer of reflective material being so thin and sparsely applied so that only a fraction of light impinging thereon is reflective and the remainder passes therethrough, and
a third transparent element having a second pattern identical to said first pattern formed thereon in axial alignment with said first pattern,
said second pattern and the field surrounding said second pattern having colors which cancel out said first color and second color when light passes therethrough,
whereby when the multiple element construction is viewed from the side reflecting light from said second element, the first and second patterns provide an image of given colors and when the multiple element construction is viewed from its other side, the multiple element construction appears as a given single colored item.

7. The multiple element construction set forth in claim 6 wherein:
said first, second and third elements are bonded to a supporting lens,
said supporting lens can be colored to counteract the color combination arrived at by the assembly of the first and third elements.

8. A pair of sunglasses comprising:
a frame,
a pair of temples one arranged at each end thereof for extending laterally therefrom in a common direction,
a pair of multiple element lenses spacedly mounted on said frame in a common plane comprising a sequential assembly of:
each of said multiple element lenses comprising a first transparent element having a first pattern formed thereon,
said first pattern having a first color and a field surrounding said first pattern having a second color,
a second transparent element coated with a relatively thin layer of reflective material,
said thin layer of reflective material being so thin and sparsely applied so that only a fraction of light impinging thereon is reflective and the remainder passes therethrough, and a third transparent element having a second pattern identical to said first pattern formed thereon in axial alignment with said first pattern,
said second pattern having a color identical with said second color of said first element and the field surrounding said second pattern having a color identical with said first color of said first pattern.

9. A multiple element construction comprising:
a first transparent element having a first pattern formed thereon,
said first pattern having a first color and a field surrounding said first pattern having the same color, but of different intensity,
a second transparent element coated with a relatively thin layer of reflective material,
said thin layer of reflective material being so thin and sparsely applied so that only a fraction of light impinging thereon is reflective and the remainder passes therethrough, and
said first element being applied to said second element without altering the reflective constitution of said second element,
a third element aligned with said first element,
said third element being tinted to enhance the color of said first pattern and said field surrounding said first pattern.

* * * * *